Feb. 18, 1958  R. H. LEONARD  2,823,962
BEARING ASSEMBLY AND CLOTHES DRYER EQUIPPED THEREWITH
Filed April 19, 1957  3 Sheets-Sheet 2

INVENTOR.
RICHARD H. LEONARD
BY H. F. Manbeck, Jr.
HIS ATTORNEY

Feb. 18, 1958 R. H. LEONARD 2,823,962
BEARING ASSEMBLY AND CLOTHES DRYER EQUIPPED THEREWITH
Filed April 19, 1957 3 Sheets-Sheet 3
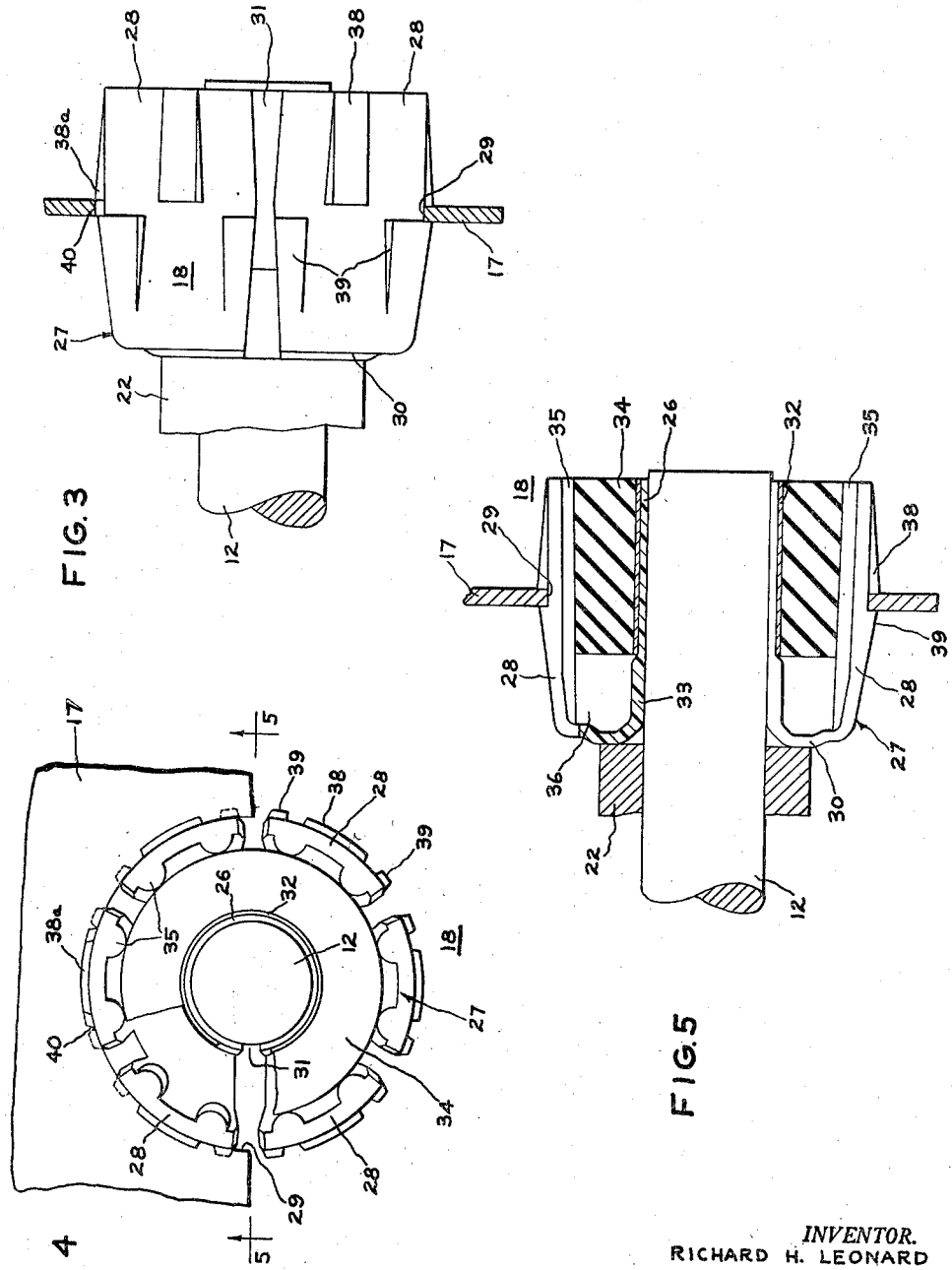
INVENTOR.
RICHARD H. LEONARD
BY
HIS ATTORNEY United States Patent Office 2,823,962
Patented Feb. 18, 1958

2,823,962

BEARING ASSEMBLY AND CLOTHES DRYER EQUIPPED THEREWITH

Richard H. Leonard, Louisville, Ky., assignor to General Electric Company, a corporation of New York Application April 19, 1957, Serial No. 653,880

6 Claims. (Cl. 308—26)

My invention relates to bearing assemblies and more particularly to bearing assemblies in which the shaft bushing is of the self lubricating type.

It is an object of my invention to provide an improved bearing assembly of the self lubricating type, including means for insulating the supporting structure from the vibrations of the rotating shaft.

It is another object of my invention to provide an improved self lubricating bearing assembly in which the bearing surface is automatically self aligning with the supported shaft.

A further object of my invention is to provide an improved bearing assembly in which a single member serves both as the bearing surface for the supported shaft and as a mounting means for the assembly.

Another object of my invention is to provide an assembly of this later type in which the single bearing and mounting member also acts as a thrust bearing for the supported shaft.

My invention also has as its object the provision of an improved bearing arrangement for supporting the rotating shaft or shafts of a domestic clothes dryer or the like, in which the bearing assemblies may be readily snapped into place with no external fastening means whatsoever being required.

In carrying out my invention in one form thereof, I provide a vibration absorbing bearing assembly having a split bushing member formed of a self lubricating material. This split bushing member acts both as the bearing surface and as the mounting means of the assembly. For the bearing surface it includes an inner sleeve which surrounds the supported shaft, and for the mounting means it is provided with another portion which engages the supporting member of the assembly. The inner sleeve is surrounded by a rigid ferrule which holds it to a predetermined bearing diameter for the shaft; and positioned between the ferrule and the outer portion of the bushing member is a resilient cylinder that engages both. The resilient cylinder holds the outer portion in firm engagement with the stationary supporting member of the assembly and thereby the assembly is securely mounted with no additional fastening means being required. Also, by its resilience the cylinder provides vibration insulation between the shaft and the supporting member, and it allows for shifting of the inner sleeve relative to the support to align the bearing surface automatically with the shaft.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

Fig. 3 is an elevation of one of the bearing assemblies with the assembly being shown in its mounted position within its associated supporting member;

Fig. 4 is an end elevation view of the bearing assembly of Fig. 3; and

Fig. 5 is a longitudinal sectional view of the bearing assembly taken on the line 5—5 of Fig. 4.

Figure 1:
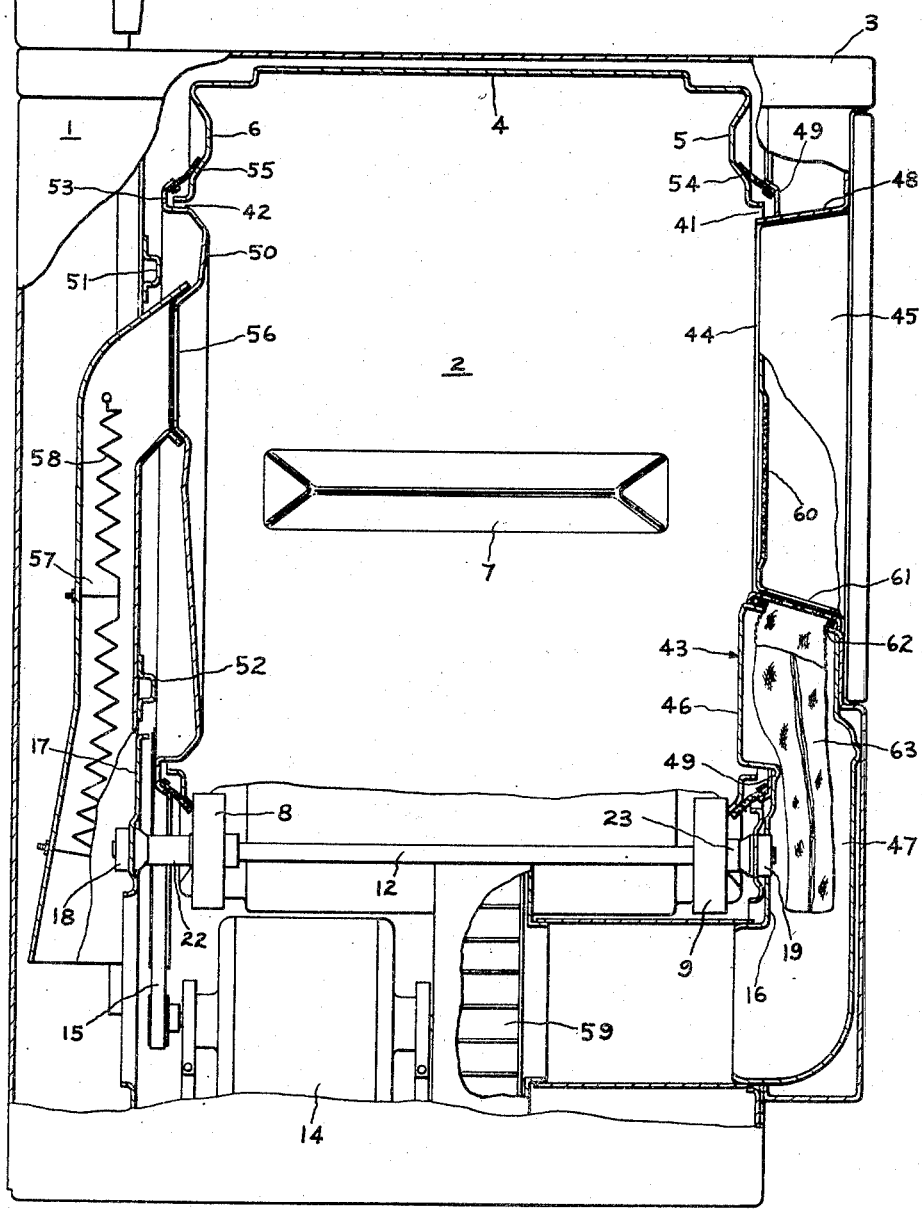
Fig. 1 is a side elevational view of a clothes dryer employing a bearing arrangement which includes a plurality of bearing assemblies embodying my invention, the view being partially sectionalized and partially broken away to illustrate detail of the dryer.
Figure 2:
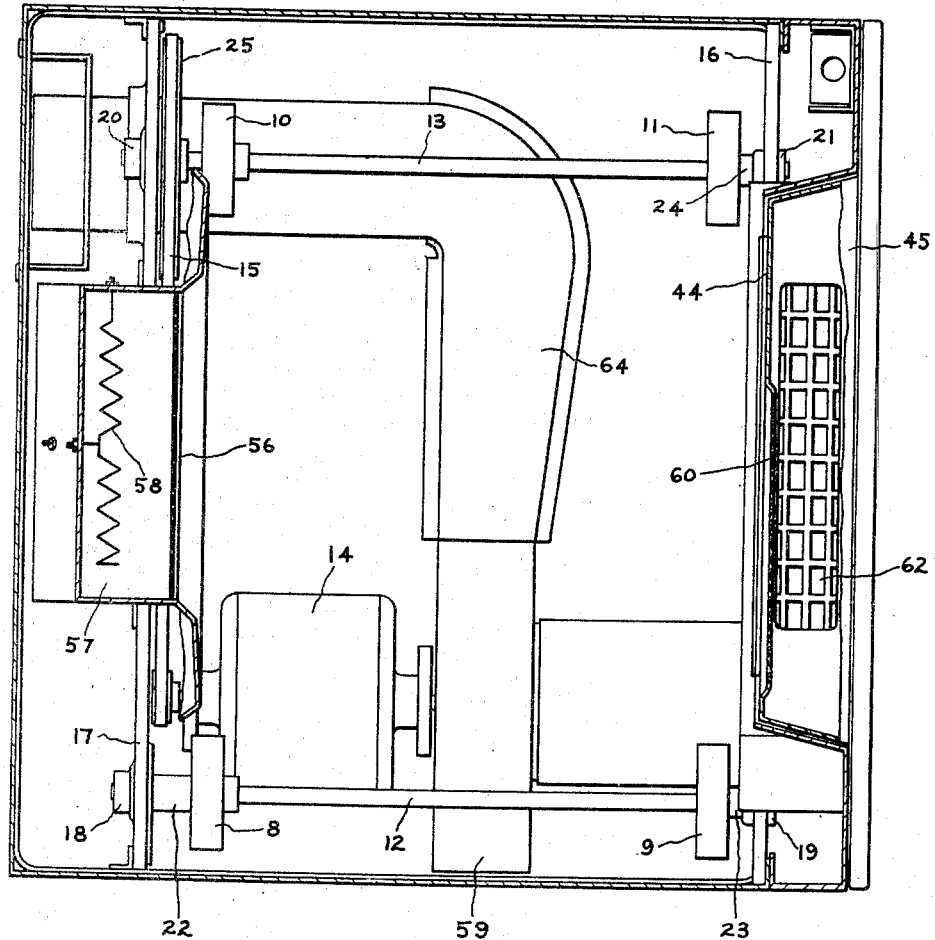
Fig. 2 is a plan view of the dryer with the basket removed and with certain surfaces partially broken away and partially sectionalized to illustrate further detail and to show the relative location of the various bearing assemblies.

Referring now to Figs. 1 and 2 I have shown therein a domestic clothes dryer 1. The dryer 1 includes a rotatable open ended clothes tumbling basket 2 which is mounted for rotation about the horizontal axis. The basket 2 is disposed within a suitable outer casing 3 which encloses it on all sides, and it comprises a cylindrical drum like member having an outer cylindrical wall 4 and front and rear end walls 5 and 6. The outer cylindrical wall 4 is imperforate over its entire length, and on its interior surface it is provided with a plurality of clothes tumbling ribs. One such rib is shown at 7 in Fig. 1.

The clothes basket is rotatably supported within the casing 3 by means of a plurality of rollers 8, 9, 10 and 11. (See Fig. 2.) The rollers 8 and 9 are mounted on a rotatable idler shaft 12 and the rollers 10 and 11 are mounted on a power shaft 13. The idler shaft 12 has no driving connection but the power shaft 13 is driven from the main drive motor 14 of the machine by means of a belt and pulley drive 15. As shown, both the drive shaft 13 and the idler shaft 12 are supported adjacent the front and rear of the dryer by means of bearing assemblies mounted in front and rear support members or plates 16 and 17. Being freely supported on the roller wheels, it is apparent that the basket 2 will turn or roll thereon whenever the drive shaft 13 is turned by the motor 14. The ratio of the drive and driven pulleys in the drive 15 is suitably chosen so that the basket is rotated at an appropriate speed providing a clothes tumbling action for the articles of clothing placed therein.

The bearing assemblies in which the shafts 12 and 13 are mounted form an important aspect of my invention and will now be described in detail. The shaft 12, as shown, is mounted by bearing assemblies 18 and 19, and the shaft 13 by assemblies 20 and 21. These assemblies, all of which are identical, serve both as journaling means and as thrust surfaces. Any axial thrust of the shafts specifically is taken up by the end surfaces of the bearings facing the various rollers. As shown, the axial thrust of the shaft 12 is transmitted to the bearing assemblies 18 and 19 respectively by means of a spacer 22 axially fixed on the shaft and the outer hub 23 of roller 9. Similarly the axial thrust of the shaft 13 is transmitted to the bearing assemblies 21 and 20 respectively by the hub 24 of roller 11 and the outer hub (not shown) of the pulley 25. The surfaces of the bearing assemblies which are contacted by these thrust members will be pointed out hereinafter.

Considering now the bearing assembly 18 as exemplary of all of the assemblies and referring to Figs. 3-5, it will be seen that the shaft 12 is journaled in it by means of a split sleeve 26 which is formed as an internal part of a split bushing member 27. The split sleeve 26 surrounds the shaft and forms the bearing surface within which the shaft rotates. The bushing member 27 is formed of self lubricating material, such as for example nylon or other suitable plastic material, which will readily permit the rotation of the shaft without binding or overheating and in many instances without lubricants being required. In addition to the split journaling sleeve 26 the bushing member also includes an outer or mounting portion which comprises a plurality of separate prongs or legs 28. These legs 28 are adapted to engage the edge of a suitable aperture 29 provided in the support plate 16 so as to mount the entire bearing assembly. Thus the single bushing member 27 besides journaling the shaft, also serves as the mounting means for the bearing assembly.

In addition to these two functions the bushing member 27 also provides a third function within the assembly. In particular, it also acts as a thrust bearing to take up any axial thrust of the shaft 12. Referring to Figs. 3 and 5 it will be noted that the inner sleeve 26 and the outer legs 28 are connected at the one end of the bushing by means of an integral annular portion 30. This annulus 30, which extends transversely to the inner sleeve and the outer legs, forms a thrust surface which is contacted by the shaft spacer 22 during the shaft rotation. Due to the contact the shaft 12 cannot move to the right as viewed in Figs. 3 and 5; however, there is no appreciable drag on the shaft due to the contact since the annulus 30, like the inner sleeve, is self lubricating to provide a relatively frictionless bearing surface. Thus, as indicated above, the bushing member 30 in addition to acting as shaft journal and a mounting means also serves as a self lubricating thrust bearing. It will be noted incidentally that the annulus or thrust surface 30 is split along the same line as the inner sleeve of the bushing, which split 31 in the illustrated embodiment continues through the outer portion of the bushing as a space between two of the legs.

In order to maintain the proper bearing diameter for the rotating shaft, there is disposed around the split sleeve 26 a rigid ferrule or tube 32. This tube 32 which is preferably formed of metal, for example, hard aluminum, is inserted over the sleeve 26 from the open end of bushing, i. e., the end opposite the annulus 30; and when it is in place, it holds the sleeve to the correct bearing diameter. The sleeve being split, it of course confirms or adjusts to the inner diameter of the ferrule with the edges of expansion slot or slit 31 moving toward each other as the ferrule is slipped over the sleeve. It will be noted further that the slit 31 allows for expansion or contraction of the sleeve 26 during the rotation of the supported shaft. In other words being slit, the sleeve may expand or contract with temperature and/or moisture changes without varying from the correct bearing diameter as determined by the ferrule 32.

Referring to Fig. 5 it will be seen that the sleeve 26 is enlarged in thickness, as indicated at 33, in the region adjacent the annulus 30. The edge of this thicker portion 33 provides a stop or abutment limiting the extent to which the ferrule 32 can be pushed over the sleeve and thereby determines the position of the ferrule in the sleeve. It will be understood that the ferrule is not bonded in any way to the sleeve but rather may be removed from it at any time if it is desired to disassemble the bearing. The ferrule during the rotation of the shaft is effective to conduct some heat away from the bearing sleeve 26, and if extended outwardly past the outer or free end of the sleeve, it can be used as a radiating surface for heat dissipation. In the illustrated bearing, however, not enough heat is generated at the bearing surface to make such an extension of the ferrule desirable.

In order to reduce the vibration transmitted to the supporting plate 16 and also in order to hold the assembly securely on the support plate, there is positioned around the ferrule 32, between it and the outer portion or legs 28 of the bushing member, a resilient ring or cylinder 34. The cylinder 34, which may, for example, be formed of rubber, provides a resilient action between the rigid ferrule 32 and the outer legs 28 of the bushing member. As is clearly shown in Fig. 5, when the bearing assembly is inserted within the mounting aperture 29 in the support plate 17, the legs 28 are compressed or flexed inwardly into engagement with the resilient cylinder 34. As a result a biasing force is applied to the legs by the cylinder holding them in firm engagement with the edge of the aperture. In other words as the cylinder is compressed by the legs, it applies an opposing force to them holding them tightly against the sides of the aperture. It will be noted that each of the legs 28 is provided with a plurality of longitudinally extending ribs 35 on its inner surface, which ribs actually form the contact with the resilient cylinder 34. The resilient cylinder as it is compressed at these contact ribs 35 expands in the areas between the ribs, and thereby the need for maintaining close tolerances is obviated, which otherwise occur if the entire inner surface of the legs engaged the cylinder 34.

Besides holding the legs 28 in firm engagement with the mounting aperture 35, the cylinder 34 also provides a degree of vibration insulation between the inner sleeve 26 and the outer legs. It cushions or absorbs to some extent any shocks transmitted to the inner sleeve from the rotating shaft, and thus prevents the vibrations from being transmitted in their full force to the outer legs and the support plate. Also, by its resiliency the cylinder 34 provides for self alignment of the bearing surface with the rotating shaft. With the spacing between the outer legs 28 and the inner bearing sleeve 26 being controlled through the resilient cylinder, the inner sleeve may shift slightly, as required, to maintain alignment with the rotating shaft 12. Any force transmitted to any point on the bearing surface from the shaft will merely cause the sleeve 26 to compress the cylinder 34 at that point until the sleeve is aligned with the shaft, whereby the bearing is automatically self-aligned.

To assemble the bearing, the resilient cylinder 34 is ordinarily first mounted on ferrule 31, and the ferrule and the cylinder are inserted into the bushing member 27 as a unit. The enlarged portion or stop 33 of the sleeve 26 engaged by the ferrule thus in effect determines the position of the cylinder as well as that of the ferrule. It will be noted that with the ferrule 31 and the cylinder 34 both in position, there is an annular space 36 formed between their inner ends and the end or thrust annulus 30 of the bushing housing. This space 36 may, if desired, be filled with grease for adding to the self lubrication of the bearing sleeve. If a heavy grease is inserted into this space, it will not ooze out between the legs 28 but rather will pass slowly through the slot 31 onto the bearing surface to lubricate it if the bearing temperature rises high enough to fluidize the grease. The grease then flowing onto the bearing surface provides additional lubrication reducing the coefficient of friction with an accompanying lowering of the temperature. The use of grease in the bearing is, however, not necessary in many applications and it will be understood that my invention is in no way limited to a grease filled assembly.

In order that the bearing assembly will be locked in the mounting aperture 35 against axial movement, a plurality of locking ribs 38 and 39 are provided in the outer surface of each of the legs. The ribs 38 are formed centrally of the legs, and beginning at the outer edges of the legs are inclined upwardly from the principal surface thereof. These ribs then terminate an abrupt edge adjacent the midpoint of the legs. The ribs 39 are likewise inclined upwardly from the main surface of the legs to an abrupt edge adjacent the mid-point thereof, but as shown they extend upwardly from the opposite end of the legs. Specifically, they extend outwardly from the closed end of the bushing member to a point adjacent to but axially spaced from the edges of the ribs 38. It will be noted that there are two of these ribs 39 on each leg and that they are circumferentially spaced from the ribs 38.

With the abrupt edges of the ribs 39 being axially spaced from the abrupt edges of the ribs 38 there is in effect a circumferential groove formed around the midportion of the legs 28. And when the bushing member 27 is inserted in the mounting aperture 29 in the support member 16, the edge of the aperture 29 fits into this groove (see Figs. 3 and 5). The ribs 38 engage one side of the supporting plate 16 and the ribs 39 the other side, and thereby the bearing assembly is securely restrained from axial movement. The outward bias applied to the legs 38 by the resilient cylinder 34 holds the legs firmly against the support plate, so that ribs 38 and 39 cannot slip past the edges of the aperture.

The bearing assembly is mounted in the support plate by inserting it into the aperture 39 from right to left as viewed in Fig. 3, i. e., inserting it with closed end first. As the assembly passes into the aperture, the legs 28 are gradually compressed or flexed inwardly due to inclined surface of the ribs 39 and this flexing of the legs continues until the ends of the ribs 39 are reached. At that time the legs spring outwardly under the bias of the cylinder 34 with the edge of the support plate fitting into the groove between the ribs 38 and 39. The bearing assembly is then firmly mounted in the plate, being effectively restrained against axial movement in either direction as mentioned above. The assembly can, in fact, only be disassembled from the mounting by the outer ends of the legs being flexed inwardly far enough for the ribs to clear the edge of the aperture.

So that the assembly will be locked against rotational movement as well as axial movement, one of the ribs 38, particularly indicated at 38a, is formed slightly differently than the other ribs. This rib 38a does not terminate at the same point as the other ribs 38, but rather extends all the way to the adjacent edges of the ribs 39 in effect filling the circumferential groove at that region. Also, it includes side flanges extending longitudinally into the groove for a short distance. The rib 38a, when the bearing assembly is inserted into the mounting aperture 29, in the support plate, fits into a recess 40 formed in the edge of the aperture 29. The side edges of the rib then engage the sides of the recess 40 and thereby act as a key preventing turning of the bearing assembly relative to the support plate. As is shown in Figs. 3 and 4, in the illustrated bearing assembly the bushing must be disposed with the rib 38a topmost in order for it to fit into the recess 40 in the support plate to form this lock against turning of the assembly.

From the above, it will be seen that I have provided a new and improved bearing assembly which is advantageous in many ways. It is, of course, extremely simple and inexpensive with a single bushing member serving three separate functions. Firstly, the bushing member serves as the main bearing or journaling surface for the supported shaft; secondly, the bushing member mounts the bearing assembly as a whole; and thirdly, it provides a thrust bearing for the shaft. Due to inclusion of the resilient cylinder the assembly provides vibration insulation between the shaft and the supporting structure, and also the bearing surface is self aligning with the shaft by automatic compression of the cylinder. Further, the assembly is securely held in place at all times by its own action with no additional fastening means being required. The engagement between the outer legs of the bushing member and the support plate under the bias of the resilient cylinder is effective to prevent both turning and axial movement of the assembly. With all of these features and the additional ones explained above, the bearing is ideally suited for a use such as, for example, in domestic clothes dryers, wherein a dependable vibration insulating bearing is required at very low cost.

As was pointed out above, two of my improved bearing assemblies are employed with each of the basket mounting shafts 12 and 13 of the dryer 1 to provide an improved bearing arrangement. In this arrangement the bearing assemblies, of course, act both as the main rotative bearings and also as the thrust bearings. To complete now the description of the dryer it will be seen that the clothes basket 2 is provided with suitable apertures in its front and rear walls in order that heated air may be passed through the basket for drying clothes. As shown in Fig. 1, its front end wall 5 is provided with a central aperture 41 and its rear end wall is provided with a similar aperture 42. This front opening 41 is covered or closed by means of a combination bulkhead generally indicated at 43 which is formed of a number of adjacent members. Specifically, the bulkhead 43 is formed of the inner surface 44 of the access door 45 of the machine, a wall 46 of an outlet duct 47 leading from the basket, a door seat 48 for the door 45 and an annular flange 49 mounted on the door seat and the wall of the duct 47. The annular flange 49 it will be noted comprises the periphery of this combination bulkhead 43 and it surrounds the opening 41 in the basket. The access door 45 when open provides for the insertion and removal of clothes from the basket 2.

The rear opening 42 of the basket is likewise closed or covered by a stationary bulkhead. Specifically it is closed by means of a one piece bulkhead 50 which is supported from the dryer casing by means of a pair of cross supports 51 and 52. The outer edge of this bulkhead 27, as shown, is defined by a flange 53 which generally surrounds the opening 42.

It will be noted that suitable air seals are provided at both the front and the rear of the basket to prevent air leakage. A sealing member 54 mounted on the stationary flange 49 of the front bulkhead slidably engages the basket front wall 5 so as to prevent leakage into the basket through the opening 41; and a similar sealing member 55 on the flange 53 of the rear bulkhead engages the rear wall 6 to prevent leakage into the basket through the opening 42. These sealing members 54 and 55 in addition to acting as inner seals, also acts as thrust bearings for the basket 2. In other words by their resilience they hold the basket in its axial position on the rollers 8—11.

In order to dry the clothes being tumbled within the basket, a stream of heated air is introduced into it through the rear bulkhead 50, is passed axially across the basket and then is exhausted through the front bulkhead 43. For introducing the air the rear bulkhead 50 is provided with a screened air inlet opening 56; and mounted behind the bulkhead 50 and leading to this inlet 56 is an air intake duct 57 which has positioned in it an electric heater 58. The intake duct 57 is open at its lower end and the air passes upwardly through it to the opening 56 during the operation of the machine. As the air passes through the duct it is heated by the heater 58 and thus when it flows into the drum through the opening 56, it is at a suitable temperature for drying the clothes. The air incidentally enters the cabinet through a suitable louvered air opening (not shown).

The suction for drawing the air into the basket 2 through the intake duct 57 and the opening 56 is created by the means of a centrifugal blower 59 which is driven directly by the drive motor 14. To provide the suction the intake of the blower 59 is connected to the front end of the basket by means of the duct 47 and the door 45. The door 45 has a hollow interior, as shown, and it includes an opening 60 in its inner surface which communicates directly with the front end of the basket 2. The opening 60 is connected through the hollow interior of the door to a second opening 61 in the bottom of the door, and this opening 61 is in turn connected to the upper end of the duct 47 through an aligned opening 62 in the door seat 48. From the opening 62 in the door seat the duct 47 leads directly to the intake of the blower. With this duct arrangement, the blower applies a suction at the opening 60 which draws air into the basket through the intake duct 57 and the inlet 56. The air so entering the basket is drawn axially across the basket to the opening 60 and then passes downwardly through the door and duct 47 to the blower. It will be noted that as the air enters the exhaust duct through the openings 61 and 62 it passes through a fine mesh lint trap 63 which is supported by the door seat and which is effective to remove any lint carried by the air. From the blower the air is exhausted out of the machine through an outlet duct 64 which extends rearwardly to the back wall of the machine. The back wall is provided with a suitable aperture (not shown) to allow for the escape of the air from the machine.

While in accordance with the patent statutes I have described what at present is considered to be the preferred embodiment of my invention, it will be obvious to those skilled in the art that various changes and modifications may be made therein without departing from the invention, and I, therefore, aim in the appended claims to cover all such equivalent variations as fall within the true spirit and scope of the invention.

What I claim as new and desire to secure by Letters Patent of the United States is:

1. In a clothes dryer or the like, a stationary supporting member, a clothes basket, at least one shaft for rotatably supporting said basket, and a bearing arrangement for mounting said shaft comprising a pair of bearing assemblies mounting said shaft at each end thereof, each of said assemblies including a split bushing member including an inner sleeve for rotatably supporting said shaft, a pair of outer legs for engaging said stationary member, and a transverse annular portion connecting said sleeve and said legs, a rigid ferrule surrounding said sleeve for holding said sleeve to a predetermined bearing diameter and a resilient cylinder disposed between said ferrule and said legs for resiliently holding said legs in engagement with said mounting member, and thrust elements mounted on said shaft adjacent the ends thereof for engaging said annular portions of the opposite bushing members to hold said shaft in a predetermined axial position during rotation.

2. A vibration absorbing bearing assembly for supporting a rotating shaft, comprising a split bushing member including an inner sleeve for rotatably supporting said shaft and an outer portion for engaging a supporting member, a rigid ferrule surrounding said sleeve for holding said sleeve to a predetermined bearing diameter, and a resilient cylinder disposed between said ferrule and said outer portion of said bushing member for resiliently holding said outer portion in engagement with said supporting member.

3. A vibration absorbing bearing assembly for supporting a rotating shaft, comprising a split bushing member including an inner sleeve for rotatably supporting said shaft, a plurality of outer legs for engaging a supporting member, and a transverse annulus connecting said sleeve and said legs at one end thereof, a rigid ferrule surrounding said sleeve for holding said sleeve to a predetermined bearing diameter, and a resilient cylinder disposed between said ferrule and said legs for resiliently holding said legs in engagement with said supporting member, said cylinder being yieldable to allow for alignment of said sleeve with said shaft.

4. A bearing assembly for supporting a rotating shaft having a thrust element thereon, comprising a split bushing member including an inner split sleeve surrounding and rotatably supporting said shaft, an integral outer portion for engaging a supporting member, and a transverse annular portion connecting said sleeve and said outer portion at one end thereof and forming a thrust bearing surface for engaging said thrust element, whereby said bushing member both supports and axially positions said shaft, a rigid ferrule surrounding said sleeve for holding said sleeve to a predetermined bearing diameter, and a resilient cylinder disposed between said ferrule and said legs for resiliently holding said outer portion in engagement with said supporting member.

5. A bearing assembly for mounting a rotating shaft having a thrust element thereon, comprising a split bushing member including an inner split sleeve surrounding and rotatably supporting said shaft, a plurality of outer legs for engaging a supporting member, and a transverse annular portion connecting said sleeve and said outer legs on one end thereof and forming a thrust bearing surface for engaging said thrust element, whereby said bushing member both rotatably supports and axially positions said shaft, a rigid ferrule surrounding said sleeve for holding said sleeve to a predetermined bearing diameter, and a resilient cylinder disposed between said ferrule and said legs for resiliently holding said legs in engagement with said supporting member, said cylinder being yieldable to allow for alignment of said sleeve with said shaft.

6. A bearing assembly for mounting a rotating shaft having a thrust element thereon, comprising a split bushing member including an inner split sleeve surrounding and rotatably supporting said shaft, an integral outer portion for engaging a supporting member, and a transverse annular portion connecting said sleeve and said outer portion at one end thereof and forming a thrust bearing surface for engaging said thrust element, whereby said bushing member both rotatably supports and axially positions said shaft, and a rigid ferrule surrounding said sleeve for holding said sleeve to a predetermined bearing diameter.

References Cited in the file of this patent

UNITED STATES PATENTS

| | | |
|---|---|---|
| 1,923,892 | Skillman | Aug. 22, 1933 |

FOREIGN PATENTS

| | | |
|---|---|---|
| 498,576 | Belgium | Oct. 31, 1950 |